US008724601B2

(12) United States Patent
Lee et al.

(10) Patent No.: US 8,724,601 B2
(45) Date of Patent: May 13, 2014

(54) UNIVERSAL-SERIAL-BUS-COMPATIBLE APPARATUS

(75) Inventors: Ching-Hsiang Lee, Taipei (TW); Yen-Ruey Li, Taipei (TW)

(73) Assignee: Azureware Technologies, Inc., Taipei (TW)

( * ) Notice: Subject to any disclaimer, the term of this patent is extended or adjusted under 35 U.S.C. 154(b) by 910 days.

(21) Appl. No.: 12/882,696

(22) Filed: Sep. 15, 2010

(65) Prior Publication Data

US 2011/0164598 A1 Jul. 7, 2011

(30) Foreign Application Priority Data

Jan. 6, 2010 (TW) ................................ 99200172 U

(51) Int. Cl.
*H04W 4/00* (2009.01)

(52) U.S. Cl.
USPC ........................................... 370/338; 370/401

(58) Field of Classification Search
CPC ...... H04W 48/17; H04W 48/18; H04W 88/06
USPC .............. 361/90; 711/100; 370/338, 389, 401
See application file for complete search history.

(56) References Cited

U.S. PATENT DOCUMENTS

| 7,319,715 B1* | 1/2008 | Souissi et al. ................. 375/220 |
| 2003/0031150 A1* | 2/2003 | Yukie ............................. 370/338 |
| 2007/0223161 A1* | 9/2007 | Kiyozaki ........................ 361/90 |
| 2008/0215795 A1* | 9/2008 | Ishii et al. ...................... 711/100 |
| 2009/0180451 A1* | 7/2009 | Alpert et al. ................... 370/338 |
| 2010/0142500 A1* | 6/2010 | Sudak ............................ 370/338 |
| 2010/0316021 A1* | 12/2010 | Lerzer et al. .................. 370/331 |
| 2011/0038314 A1* | 2/2011 | Lee ................................ 370/328 |
| 2011/0085498 A1* | 4/2011 | Oba et al. ...................... 370/328 |
| 2011/0110332 A1* | 5/2011 | Kim et al. ..................... 370/331 |
| 2013/0286973 A1* | 10/2013 | Selia et al. .................... 370/338 |

* cited by examiner

*Primary Examiner* — Jeffrey M Rutkowski
(74) *Attorney, Agent, or Firm* — Houtteman Law LLC

(57) ABSTRACT

Provided is a USB-compatible apparatus. More particularly, the USB-compatible apparatus integrates a mobile communication module (such as 3G/3.5G/3.75G) and a WLAN module (such as WiFi) into a singular USB apparatus. Inside the body of the USB-compatible apparatus, a routing module is introduced to bridge the mobile communication module and the WLAN module so as to forward the transferred or received data packets therebetween. A plurality of terminal computers can connect to a network via this USB-compatible apparatus since the inside WLAN module provides multiple wireless ports for the terminal computers. The USB-compatible apparatus further has a power-management module for performing arrangement of electric power among the inside modules. The USB-compatible apparatus particularly uses a USB interface to take an external power. Preferably, the apparatus can take power directly from a computer system, or use alternating current or direct current via an adapter.

14 Claims, 6 Drawing Sheets

UNIVERSAL-SERIAL-BUS-COMPATIBLE APPARATUS

BACKGROUND OF THE INVENTION

1. Field of the Invention

The present invention relates to a universal-serial-bus compatible device, more particularly to the USB-compatible device having two heterogeneous network modules, and implementing a routing function for forwarding the packets between two networks.

2. Description of Related Art

As network applications are getting widespread, the need of mobile networking is increasing everyday. Usually, hot spots for the wireless local area network are used, otherwise the mobile communication networks, such as 3G/3.5G/3.75G network or other equal technologies, linked to Internet are also growing.

Generally speaking, the mentioned mobile communication networking is preferably for personal use since one person may apply for one mobile network card for his own personal computer. If plural computers nearby are simultaneously getting on network through the one mobile network card, some configurations are needed. This situation causes inconvenience on those users, and the host connected with the one mobile network card gets much extra loads since it needs to deal with the passing-through packets from others.

In conventional technology, a kind of network sharing machine has been designed for sharing the networking ability for other users in accordance with the above-described requirements. The related technology is referred to FIG. 1 depicting a schematic diagram of a network sharing machined used for sharing the one mobile communication network.

A mobile communication sharing machine 10 is employed, and used for connecting to a mobile communication connecting device 12 provided by a specific mobile networking provider. Thereby, many people can get on the 3G/3.5G/3.75G network via the mobile communication network 14.

The mentioned mobile communication sharing machine 10 is internally equipped with a function for sharing the wireless local area network (WiFi). Besides there is a built-in WLAN module, a data processor, a power management circuit, a memory and other required circuits are also included. A plurality of terminal computers numbered as 101 may firstly connect to the mobile communication sharing machine 10 via WLAN protocol. Through a routing function of this mobile communication sharing machine 10, the data packets produced by the terminal computers 101 are forwarded to a mobile communication network 14, and to Internet 16. In the current example, the mobile communication sharing machine 10 can connect with the one or more terminal computers 101 or other network-enabled devices through the WLAN protocol. There shows a terminal computer 103 connected with the machine 10 via a wired connection.

According to above-described technology, a mobile communication sharing machine 10 supporting the mobile communication connecting device 12 is used. This mobile communication sharing machine 10 uses the conventional WLAN sharing technology to share the mobile network, so that many people can get on Internet therethrough at the same time.

SUMMARY OF THE INVENTION

Other than the conventional technology which incorporates a mobile communication sharing machine providing the mobile communication network for many users, a singular USB apparatus is provided in accordance with the present invention. It advantages the USB apparatus to take power from a computer system or any other external power source, and introduce miniaturization technology. More particularly, a mobile communication module and a WLAN module are integrated into one USB apparatus.

According to the preferred embodiment of the present invention, the USB apparatus includes a USB connector body and a USB interface. Through the USB interface, the apparatus can take power from a computer system via its USB port. Alternatively, a power source adapter may be particularly introduced to use an external power source therethrough.

The internal circuits of USB connector body at least have a mobile communication module and a WLAN module. A data interface is interconnected between the mobile communication module and the WLAN module. The USB apparatus simultaneously has capability of connecting to a wireless local area network and a mobile communication network. A routing module is particularly built in the apparatus and used for bridging the mobile communication module and the WLAN module. The routing module is used for forwarding data packets among the modules. The USB connector body further has a power management module which is used for allocating power among the modules.

In another embodiment of the present invention, the USB apparatus includes more than two heterogeneous network modules. The mentioned routing module is also used for forwarding the data packets from the different networks. The USB apparatus achieves to share the network connection.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

In order to implement a networking environment for multiple users through a singular USB apparatus, the USB apparatus provided in the present invention integrates at least two heterogeneous network modules. The modules preferably have a WLAN module and a mobile communication module. In particular, the USB apparatus is equipped with a power-management chip. Via a USB interface, the USB apparatus may take power from a computer system or other external power sources. The interface is preferably a Type-A USB plug which is used to take power from a connected computer host. A routing module is further introduced to interconnect the two network circuits for the purpose of integration and miniaturization.

Figure 1:
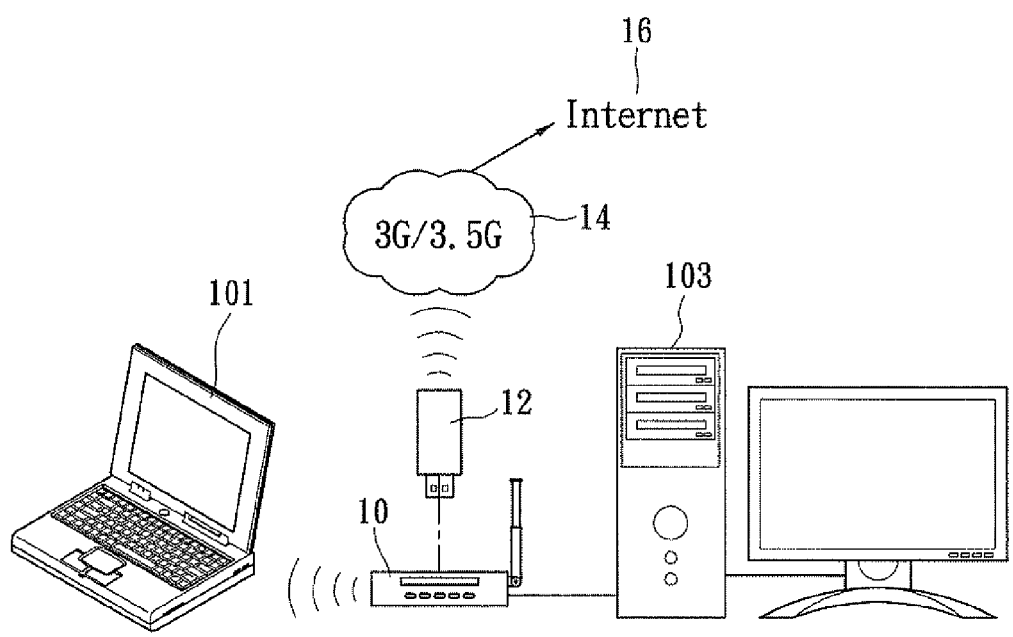
FIG. 1 shows a schematic diagram of mobile communication network using a network sharing machine of a conventional art.
Figure 2:
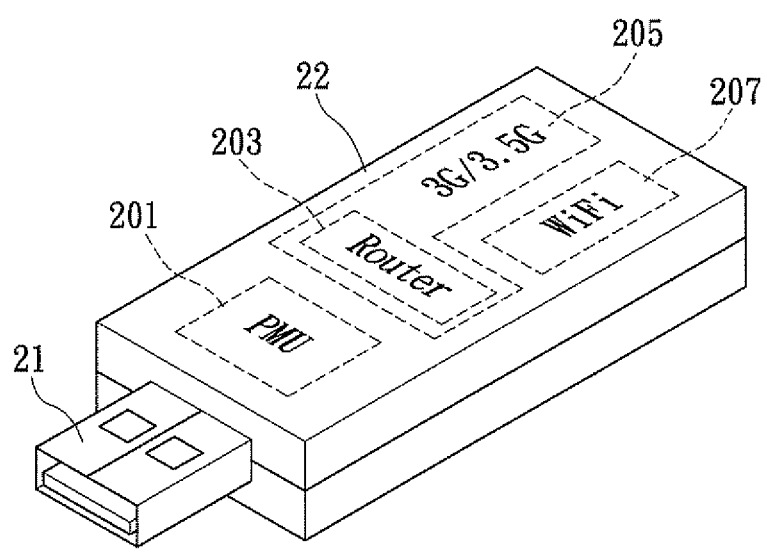
FIG. 2 shows a schematic diagram of a USB apparatus in accordance with the present invention.

Reference is made to FIG. 2 showing an embodiment of the USB apparatus in accordance with the present invention. The shown USB apparatus primarily includes a USB connector body 22 used for integrating the circuits, and a USB interface 21 connected to the computer system or a power source. In a preferred embodiment, the USB connector body 22 is constituted with the transceivers, antennas, and related circuits of a mobile communication module 205 and a WLAN module 207. The plural terminal computers may connect to 3G/3.5G/3.75G networks or other equivalent mobile communication network via the mobile communication module 205 in the body 22. Each terminal computer connects to the USB apparatus through the WLAN module 207 in the body 22. Furthermore, the routing function, by the routing module 203, is incorporated in the mobile communication module 205 for forwarding the passing through packets. The plural terminal computers then connect to the external 3G/3.5G/3.75G network or other like mobile communication network through the mobile communication module 205 of the claimed USB apparatus.

The USB connector body 22 particularly has a power-management unit 201 to allocate power for the inner circuits through the USB interface 21. For example, the USB apparatus gets electric power via the USB interface 21 from the connected computer system, or the other independent power source such as the external direct current source, city power or the other alternating current source.

Figure 3:
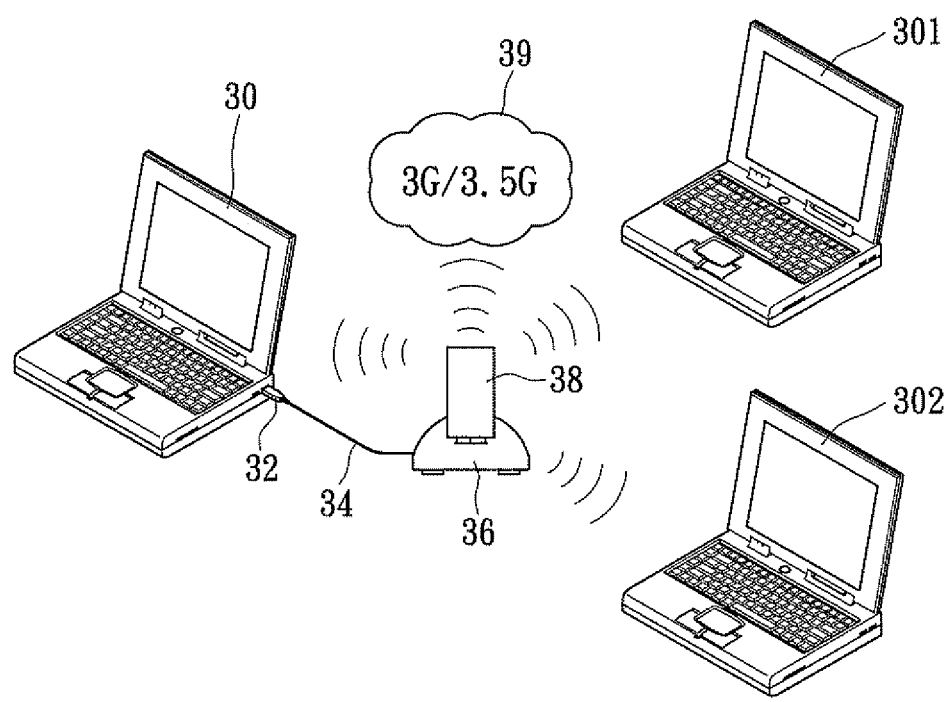
FIG. 3 shows a first embodiment of network sharing using the USB apparatus of the present invention.

FIG. 3 shows a schematic diagram of the embodiment of the USB apparatus. A USB apparatus 38 is plugged in the socket of a power source adapter 36 via its USB interface. Preferably, this power source adapter 36 merely provides a power source interface, but not includes any network-related circuit. A USB connecting terminal 32 of the power source adapter 36 is used to connect to a computer host 30 using a USB connecting cable 34. This USB connecting cable 34 is only the cable for supplying electric power, but not delivering any data signals. In the current embodiment, the computer host 30 also gets on the WLAN from this apparatus 38, and connects to a mobile communication network 39 via the inside routing function. The USB apparatus 38, which is similar to a network sharing machine, provides multiple WLAN ports for the plural terminal computers 301, 302. Therefore, the each terminal computer in a local area network can get on the external network there-through.

Figure 4:
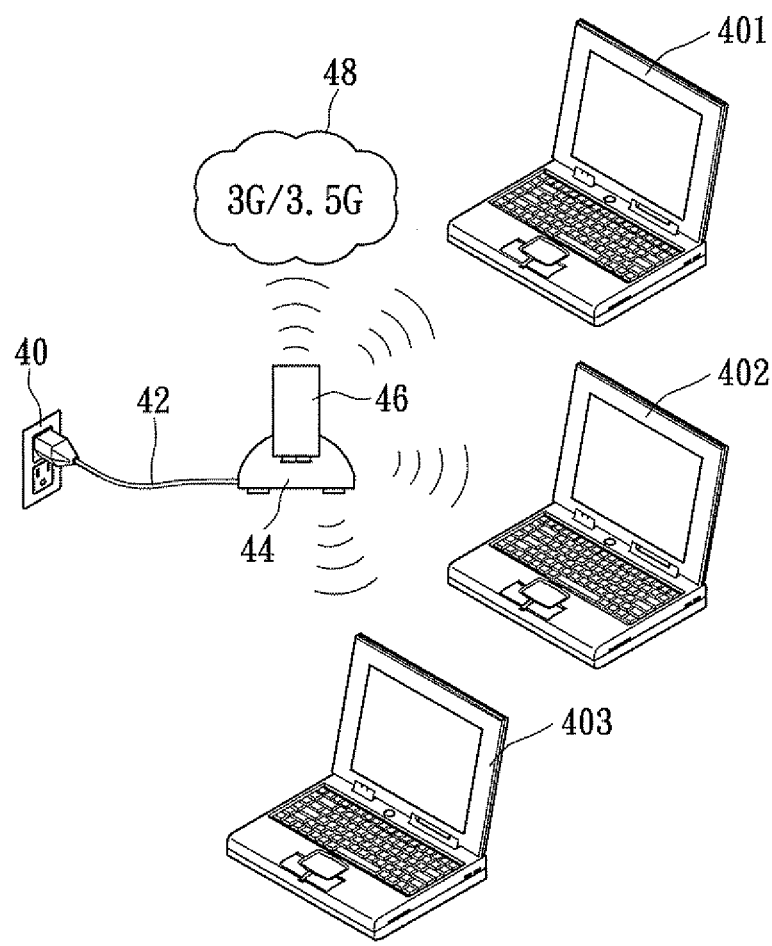
FIG. 4 shows a second embodiment of network sharing using the USB apparatus of the present invention.

Since the claimed USB apparatus can be a network sharing machine using an independent electric power source, the diagram of the relevant connection can be referred to FIG. 4. A USB apparatus 46 is connected with a power source adapter 44 via a USB interface in accordance with a preferred embodiment. Other than the embodiment shown in FIG. 3, the power source adapter 44 connects to an AC interface 40 via a power line 42. The AC interface 40 exemplarily is an indoor plug for city power. Alternatively, the power source can also be other alternating current source or direct current source.

After the USB apparatus 46 is powered on, a wireless local area network is established. The WLAN may range over the shown terminal computers 401, 402, 403 which connect with the USB apparatus 46 in compliance with a WiFi protocol. The built-in routing module functions the signals forwarding to a mobile communication network 48.

Figure 5:
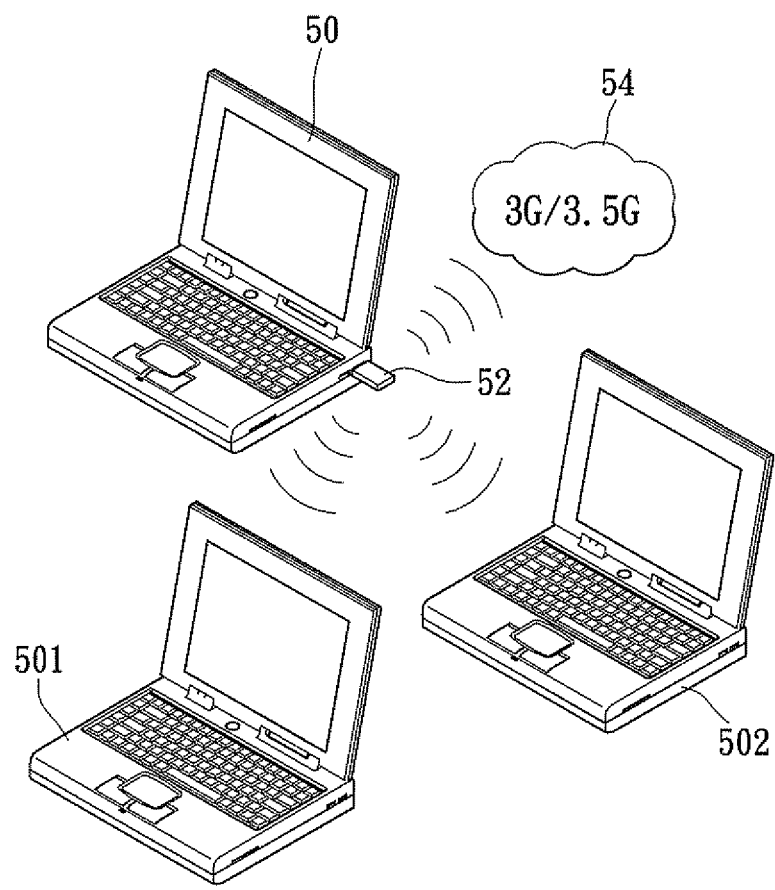
FIG. 5 shows a third embodiment of network sharing using the USB apparatus of the present invention.

FIG. 5 depicts another schematic diagram of the network sharing function provided by the claimed USB apparatus. A shown USB apparatus 52 is just as a usual USB device that is directly connected to a computer host 50 via a USB interface. The USB interface is preferably a Type-A USB interface when the apparatus 52 can take power from the connected computer host therethrough.

More particularly, the USB apparatus 52 may operate under two operation modes. One of the operation modes is a routing mode, in which the USB apparatus 52 merely takes power from the computer host 50, but not delivers any data signals. That means the USB apparatus 52 provides a routing function between the two networks under this routing mode. Meanwhile, the connected computer host 50, just like the other terminal computers, connects to the WLAN through this USB apparatus 52. In accordance with the present invention, the USB apparatus 52 at least includes two wireless network modules, and therethrough the terminal computers 501, 502 can link the mobile communication network 54 by the built-in routing function when they firstly connect to the WLAN.

The other operation mode is a dongle mode, and thereby the computer host 50 may directly activate this USB apparatus 52 by executing a driver. Then the computer host 50 may be configured to connect to the mobile communication network 54 via the USB apparatus 52. Under this dongle mode, the USB apparatus 52 may simultaneously transfer the signals among the computer host 50 and the external networks, but not only take power or perform the routing function. The computer host 50 in connection with this USB apparatus 52 can therefore connect to the external network. In a preferred embodiment, the users may make a selection via a configuration interface, such as a software-implemented switch or an external switch, for switching one of the operation modes.

According to the above-described embodiments, the USB apparatus merely takes electric power from external. The body has a routing circuit, and the two heterogeneous wireless network circuits. The inside WLAN circuit is used for the plural terminal computers to connect with the mobile communication network. The related circuit block can be referred to FIG. 6.

Figure 6:
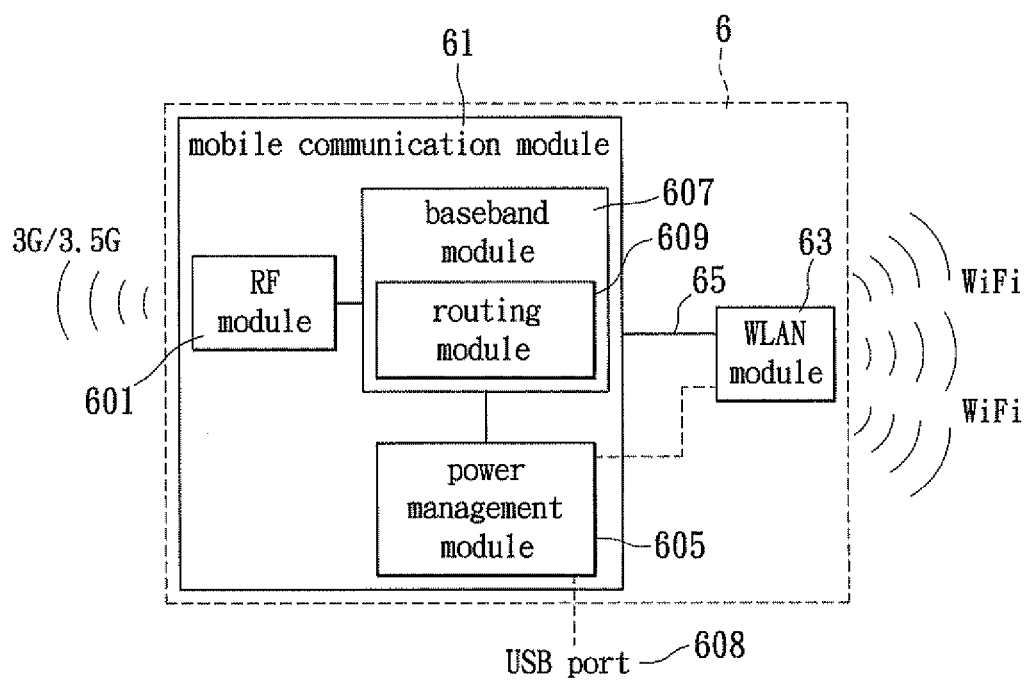
FIG. 6 shows a circuit diagram of the USB apparatus in accordance with the present invention.

In FIG. 6, a USB apparatus 6 is provided. The apparatus 6 at least includes a mobile communication module 61 and a WLAN module 63, and respectively provided for connecting to 3G/3.5G/3.75 mobile network, and WLAN.

The mobile communication module 61 particularly includes an RF module 601, a baseband module 607, and a power management module 605. Further, a routing module 609 is incorporated to bridge the two network modules. In an example, the routing module 609 is implemented as software that is programmed into a firmware, or alternatively the routing module 609 can be made by a chip circuit. The power management module 605 is connected to the external power source via USB port 608.

In accordance with the preferred embodiment, the WLAN module 63 is provided for the terminal computers to connect the WLAN, and through the networking capability of mobile communication module 61, the terminal computers may connect to the mobile communication network. In which the mobile communication module 61 is connected with the WLAN module 63 via a data interface 65, which is electrically communicated therebetween. The routing module 609 is used to bridge the two heterogeneous networks, and forward the data packet.

The routing module 609 is preferably implemented by software, or alternatively made by an electrical circuit, and used to deal with the passing-through data packets between the two heterogeneous networks. In order to avoid the additional cost, the programmed routing module 609 is disposed into a firmware in the baseband module 607 in accordance with the present invention.

The power management module 605 electrically connects to the inner circuit modules of the USB apparatus. The module 605 is essentially for performing power allocation on the inner circuit modules. Not only the power management module 605 electrically connects to the mobile communication module 61 including baseband and RF modules, but also supplies power to the WLAN module 63. The USB interface 608 is an outward port to takes power for the power management module 605. The external power sources include a computer host and any source which is linked through the power source adapter.

The mobile communication module 61 especially has a processor (not shown), which is to process signals among the baseband module 607 and RF module 601. According to the embodiment, the processor is also regarded as the processing unit for the WLAN module 63 in order to process the WiFi signals. Furthermore, the processor is configured to signal processing or handle the data packets among the inner modules.

Inside the USB apparatus 6, a memory (not shown) is preferably provided. A server program can be installed in the memory for initiating a server routine, such as WWW server. While the server routine is initiated, a user or administrator may log on this USB apparatus from a remote end. The administrator may remotely configure the functions of the USB apparatus 6, for example, it's to configure the heterogeneous networking. Generally, the network-related configuration may include linking password, account, encryption means, information of the network service provider with regard to the mobile communication network. For the WLAN, it's configure may include MAC address block, password, account, or other matters. If the apparatus further provides a third heterogeneous network module, the related configured should also be made.

According to the preferred embodiment, the circuit block of the USB apparatus in accordance with the present invention integrates two heterogeneous network circuits, and a software or hardware-implemented routing module. However, the USB connector body also can integrate more than two heterogeneous network circuits, and the similar routing module is also used to bridge those modules, and forward the data packets among those heterogeneous network modules. In this case, the power management module further couples to the more than two network modules for performing power allocation. Furthermore, the processor electrically connects to those modules for processing the signals or packets. The inside WLAN module is provided for plural terminal computers getting on the other heterogeneous network(s) via the corresponding compatible network protocol.

To sum up, the above-described USB-compatible apparatus particular integrates two or more heterogeneous network modules. There is an inside software-implemented routing module used for forwarding the data packets between the different networks. Therefore, it accomplishes network sharing.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A USB apparatus, comprising:
    a USB connector body, and an internal circuit of the USB connector body comprising:
        a mobile communication module, providing a network-connection function, and thereby connecting with a mobile communication network;
        a WLAN module, connected to the mobile communication module via a data interface, in order to provide USB apparatus to connected to a wireless local area network;
        a routing module, bridging the mobile communication module and the WLAN module, used for forwarding data packets between the mobile communication network and the wireless local area network; and
        a power management module, electrically connected with the mobile communication module and the WLAN module for performing power allocation among the modules;
    a USB interface being an interface of the USB connector body for taking an external power source;
    wherein the USB apparatus includes a routing mode and a dongle mode; when under the routing mode, the USB apparatus takes power from a computer system via the USB interface, and simultaneously performs a routing function between the mobile communication network and the wireless local area network; when under the dongle mode, the computer system is directly connected with the USB apparatus, and connects to the mobile communication network through the USB apparatus.

2. The apparatus of claim 1, wherein USB apparatus connects to a power source adapter via the USB interface, and connects to the external power source through the power source adapter.

3. The apparatus of claim 2, wherein the power source adapter connects to a USB port of a computer system via a cable, and the computer system supplies power therethrough.

4. The apparatus of claim 2, wherein power source adapter has a plug at one end thereof for connecting to an alternating current source, and takes power therethrough.

5. The apparatus of claim 1, wherein the routing module is implemented by a programmable firmware.

6. The apparatus of claim 1, wherein the routing module is implemented by a circuit which bridges the mobile communication module and the WLAN module.

7. The apparatus of claim 1, wherein the USB apparatus further comprises a memory for recording a server program.

8. The apparatus of claim 1, wherein the mobile communication module has an RF module and a baseband module, and the baseband module includes a processor for processing signals generated by the baseband module and the RF module.

9. A USB apparatus, comprising:
    a USB connector body, and an internal circuit of the USB connector body comprising:
        two or more network modules, providing a capability of connecting to at least a mobile communication network and a wireless local area network;
        a routing module, wherein the routing module is implemented by a programmable firmware and bridging the two or more network modules, and used for forwarding data packets between the mobile communication network and the wireless local area network; and
        a power management module, electrically connected with the network modules for performing power allocation among the modules;

a USB interface being an interface of the USB connector body for taking an external power source;

wherein the USB apparatus includes a routing mode and a dongle mode; when under the routing mode, the USB apparatus takes power from a computer system via the USB interface, and simultaneously performs a routing function between the mobile communication network and the wireless local area network; and when under the dongle mode, the computer system is directly connected with the USB apparatus, and connects to the mobile communication network through the USB apparatus.

10. The apparatus of claim 9, wherein USB apparatus connects to a power source adapter via the USB interface, and connects to the external power source through the power source adapter.

11. The apparatus of claim 9, wherein network modules at least includes a mobile communication module for connecting with the mobile communication network, and a WLAN module for connecting to the wireless local area network.

12. The apparatus of claim 11, wherein the mobile communication module and the WLAN module are interconnected via a data interface.

13. The apparatus of claim 11, wherein the mobile communication module has an RF module and a baseband module, and the baseband module includes a processor for processing signals generated by the baseband module and the RF module.

14. The apparatus of claim 9, wherein the USB apparatus further comprises a memory for recording a server program.

\* \* \* \* \*